United States Patent
Birkemeyer et al.

(10) Patent No.: US 8,461,970 B2
(45) Date of Patent: Jun. 11, 2013

(54) MOTOR VEHICLE HAVING A DISPLAY AND A CAMERA

(75) Inventors: Daniel Birkemeyer, Mainhausen (DE); Michael Engler, Gutach (DE); Jürgen Wolf, Frankfurt am Main (DE)

(73) Assignee: Continental Automotive GmbH, Hannover (DE)

(*) Notice: Subject to any disclaimer, the term of this patent is extended or adjusted under 35 U.S.C. 154(b) by 326 days.

(21) Appl. No.: 12/680,336

(22) PCT Filed: Sep. 25, 2008

(86) PCT No.: PCT/EP2008/062812
§ 371 (c)(1),
(2), (4) Date: Mar. 26, 2010

(87) PCT Pub. No.: WO2009/043783
PCT Pub. Date: Apr. 9, 2009

(65) Prior Publication Data
US 2010/0302019 A1    Dec. 2, 2010

(30) Foreign Application Priority Data
Sep. 28, 2007 (DE) .......................... 10 2007 046 971

(51) Int. Cl.
*B60Q 1/00* (2006.01)

(52) U.S. Cl.
USPC .................. 340/425.5; 340/691.6; 340/7.55; 340/12.54; 340/990; 340/995.1; 340/995.14; 340/995.17; 340/995.19; 340/995.26; 340/995.27; 340/461; 359/630; 359/632; 345/7; 345/8; 345/9

(58) Field of Classification Search
None
See application file for complete search history.

(56) References Cited

U.S. PATENT DOCUMENTS

| | | | | |
|---|---|---|---|---|
| 3,816,005 A | * | 6/1974 | Kirschner | 356/251 |
| 5,640,281 A | * | 6/1997 | Cho | 359/841 |
| 6,741,223 B2 | * | 5/2004 | Kobayashi et al. | 345/7 |
| 6,750,832 B1 | | 6/2004 | Kleinschmidt | |
| 6,942,489 B2 | * | 9/2005 | Tiesler | 439/34 |
| 7,230,767 B2 | * | 6/2007 | Walck et al. | 359/630 |
| 7,511,683 B2 | * | 3/2009 | Sumiyoshi | 345/7 |
| 8,081,387 B2 | * | 12/2011 | Montarou et al. | 359/632 |
| 2005/0057351 A1 | * | 3/2005 | Adams et al. | 340/461 |
| 2005/0195455 A1 | * | 9/2005 | Bruegl et al. | 359/13 |
| 2006/0244829 A1 | | 11/2006 | Kato et al. | |

FOREIGN PATENT DOCUMENTS

| | | |
|---|---|---|
| DE | 102 57 484 A1 | 7/2004 |
| DE | 20 2005 015 407 U1 | 1/2006 |
| DE | 20 1004 057 947 A1 | 6/2006 |
| DE | 10 2005 001 973 A1 | 7/2006 |
| DE | 696 18 192 T3 | 8/2006 |
| DE | 20 2005 015 407 U1 | 1/2008 |
| JP | 2000-71877 | 3/2000 |
| WO | WO 02/43041 A1 | 5/2002 |

* cited by examiner

*Primary Examiner* — Benjamin C Lee
*Assistant Examiner* — Rajsheed Black-Childress
(74) *Attorney, Agent, or Firm* — Cozen O'Connor

(57) ABSTRACT

A motor vehicle has a first display and a first camera. An environmental image of the part of the environment of the vehicle lying behind the motor vehicle can be recorded using the first camera and the environmental image recorded using the first camera can be completely or partially displayed on the first display. The first display is disposed inside the motor vehicle such that the recorded environmental image, or a part of the recorded environmental image, may be perceivable as a virtual image behind a side pane of the motor vehicle for a driver of the vehicle.

12 Claims, 3 Drawing Sheets

MOTOR VEHICLE HAVING A DISPLAY AND A CAMERA

PRIORITY CLAIM

This is a U.S. national stage of application No. PCT/EP2008/062812, filed on Sep. 25, 2008, which claims Priority to the German Application No. 10 2007 046 971.5, filed: Sep. 28, 2007; the contents of both which are incorporated here by reference.

BACKGROUND OF THE INVENTION

1. Field of the Invention

The invention relates to a motor vehicle having a display and a camera.

2. Prior Art

Motor vehicles having a first display and a first camera are known from the prior art, the first camera being able to record an image of the surroundings of the part of the surroundings of the motor vehicle lying behind the motor vehicle, and the first display being able to display completely or partially the image of the surroundings recorded by the first camera. These displays are mostly arranged in a central console of the motor vehicle. To observe the region located behind the motor vehicle, motorists usually employ rear view mirrors that are also arranged outside the motor vehicle and therefore require additional space in the width of the motor vehicle and create additional air resistance, in particular in the case of relatively high driving speeds. Consequently, it is proposed to dispense with the rear view mirrors and to arrange displays inside the motor vehicle, for example in the region of the dashboard. However, these displays are poorly readable and require an adaptation of the eyes to other distances.

SUMMARY OF THE INVENTION

It is therefore an object of the invention to achieve a form of representation of a rear view mirror that is as identical as possible in the absence of the rear view mirror. This object is achieved by a first display or a projector is arranged inside the motor vehicle such that a driver of the motor vehicle can perceive the recorded image of the surroundings or a part of the recorded image of the surroundings as a virtual image behind a side pane of the motor vehicle. This display can be designed with particular ease when the image of the surroundings or parts of the image of the surroundings can be projected against the side pane, and so the image of the surroundings or a part of the image of the surroundings can be perceived as a virtual image outside the motor vehicle. This projection can, for example, be implemented by arranging a real display or a projector in the region of the dashboard such that the motorist can perceive the image of the display through a reflection in the side pane of the motor vehicle. The image displayed with the first display, or the image projected by means of the projector thus appears to float as a virtual image behind the side pane outside the motor vehicle.

Additional warning indications can be displayed. Information can be more comprehensive, and the warning indications themselves can simultaneously be better perceived, for example it is possible to give warning indications referring to the road users determined by the camera. When the first display is designed as part of a dual view display, the first display can be used to display the image of the surroundings, and the second display of the dual view display can be used to display other information, the motorist being able to perceive the second display directly as a real image.

When a second dual view display is present, a part of the image of the surroundings can therefore be displayed to the motorist by a third display of the second dual view display via a second side pane of the motor vehicle and information can be displayed to the front seat passenger via a fourth display of the second dual view display. When one or two side panes are let down, and therefore cannot serve as reflection surface for the first and/or third display, the second display of the first dual view display can advantageously display the image of the surroundings as a real image. Instead of switching over the display from the first to the second display, it is also possible to provide an additional reflector which, with a side pane let down, can be moved into the appropriate position, it being possible to design the additional reflector to be transparent. When the motor vehicle has external mirrors which can be retracted automatically upon the occurrence of a specific situation or under the user's control, it is advantageous that the first and/or third display(s) can be deactivated given an extended mirror, since then the first and/or third display(s) are then unable to disturb the view onto the mirrors. This retractability is advantageous, firstly, at high speeds, since the air resistance is substantially reduced. At very low speeds, which occur, in particular, in the case of cramped conditions that are present, for example, when driving through a place or during parking maneuvers, a retraction of the mirrors eliminates the risk of damage. When the first and/or third display(s) can be moved translationally and/or rotationally, the positions of the virtual images that can be perceived behind the side panes can be adapted for the motorist. If, in addition, a light sensor and a dual view display with a first and second display are present, dazzling of the driver can be detected by the first display of the dual view display. The position of the dual view display can then be varied such that the driver is no longer dazzled by this first display. Consequently, the driver is not disturbed by the first display. If the second display can then simultaneously display the image of the surroundings as a real image, the motorist also does not lose information relating to the traffic situation behind his motor vehicle.

BRIEF DESCRIPTION OF DRAWINGS

The invention is described in more detail below with the aid of the figures, in which.

DETAILED DESCRIPTION OF THE DRAWINGS

Figure 1:
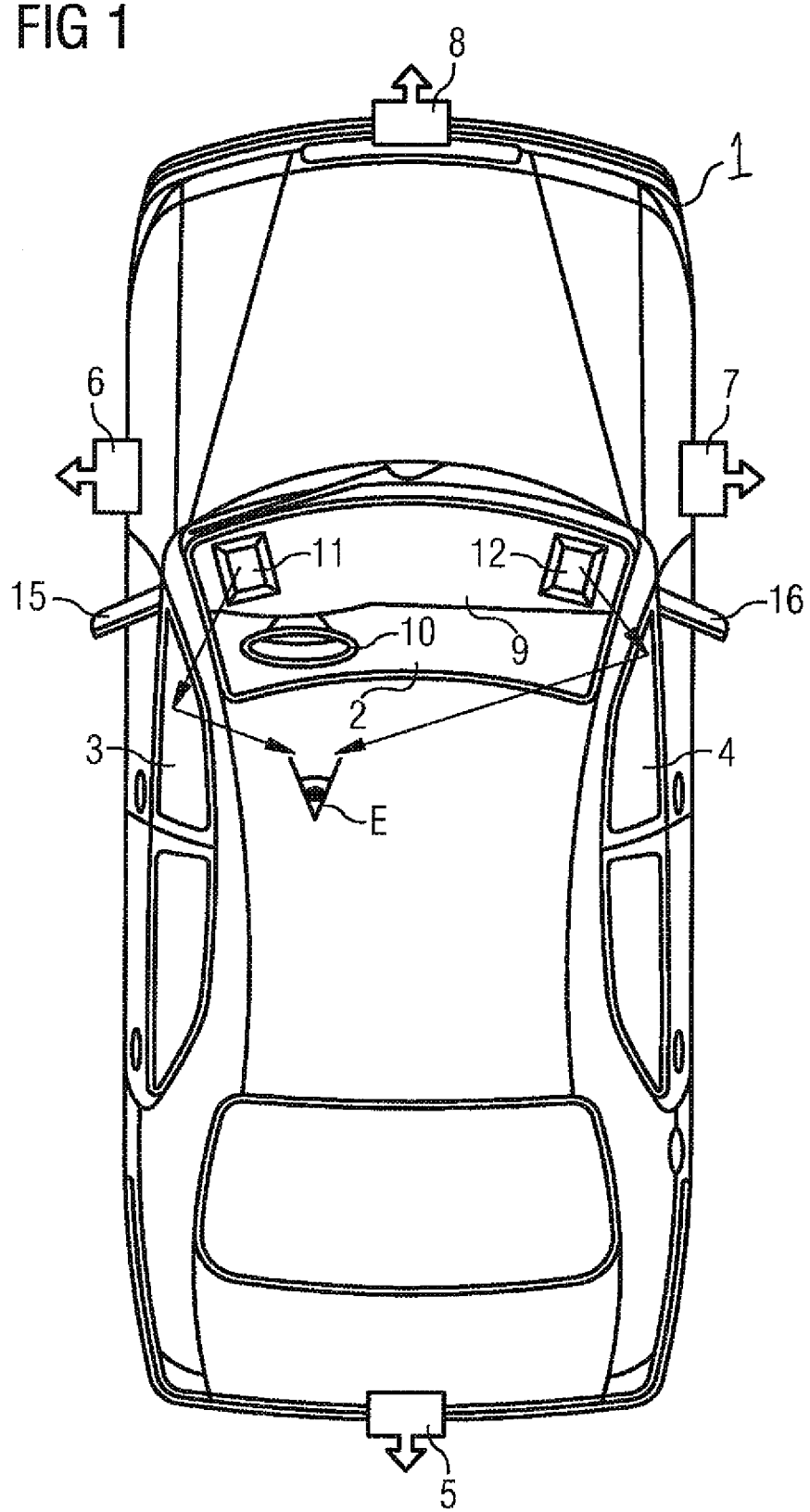
FIG. 1 is an exemplary embodiment of an inventive motor vehicle.

FIG. 1 is a motor vehicle 1 having a windshield 2, side panes 3, 4, a first camera 5, a second camera 6, a third camera 7 and a fourth camera 8. Below the windshield 2 is a dashboard 9 and a steering wheel 10. A first display 11 and a third display 12 are arranged on the dashboard 9. Instead of the first display 11 and/or the third display 12, it is also possible in each case to provide one or more projectors. Further to be seen in FIG. 1 by an eye of a motorist E and external mirrors 15, 16 arranged outside the motor vehicle 1. The first camera 5 records an image of the surroundings of that part of the surroundings of the motor vehicle that lies behind the motor vehicle. The first display 11 and/or the third display 12 or a projector then project(s) this picture against the side pane 3 and/or the side pane 4, which can then be perceived behind the side pane by the motorist's eye. A camera 5 pointing to the rear is used in the present exemplary embodiment. It is therefore sensible to project a part of the image recorded by the camera via the first display 11, and another part via the third display 12, there being no mandatory need for the parts of the images displayed to be halved exactly but rather they can preferably overlap one another since this approximates most closely to the perceptibility of the rear region by normal rear view mirrors. Furthermore, the first display 11 can display the image recorded by the second camera 6, since then it is also possible to provide the motorist with information relating to the traffic situation to the side of his motor vehicle 1, while it is likewise possible for the third display 12 to display the image recorded by the third camera 7. Of course, it is also possible to provide further cameras or other sensors, and to select the images of the surroundings that are to be displayed such that said images are the closest possible approximation of the display of a normal rear view minor. The rear view mirrors 15, 16 are illustrated folded out for the purpose of better perceptibility. It is advantageous here in normal driving operation to have the mirrors 15, 16 folded in or swung in or moved in, so that the motor vehicle 1 has as low an air resistance as possible. The cameras 5, 6, 7, 8 are illustrated by way of example such that they project from the body skin such that they can be better perceived. However, when implementing an inventive vehicle, the cameras 5, 6, 7, 8 are integrated into the body for aerodynamic and esthetic reasons.

Figure 2:
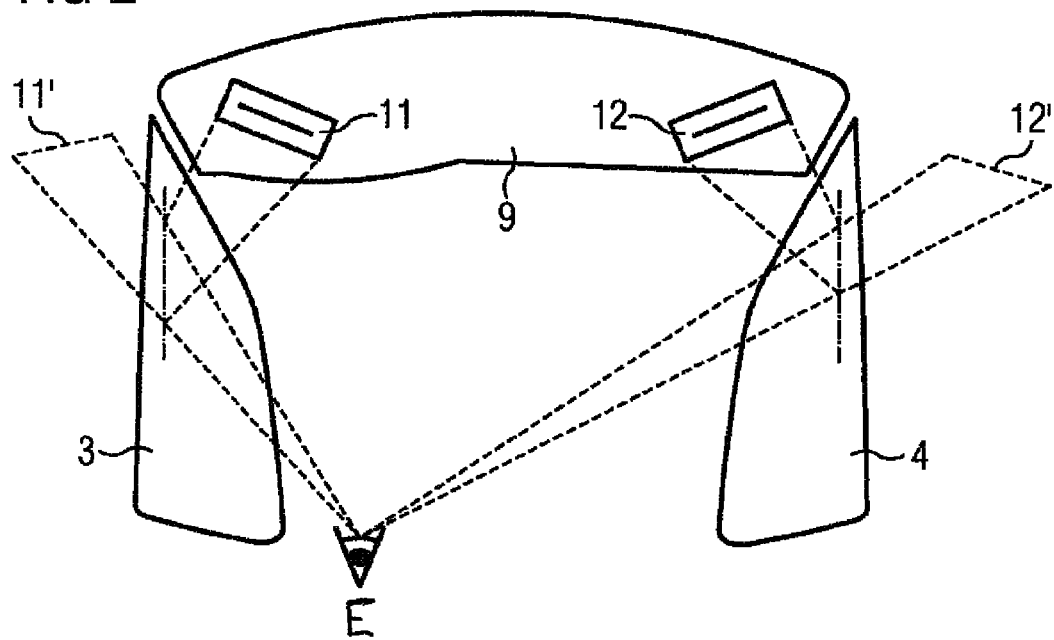
FIG. 2 is a beam path of an exemplary embodiment with two displays.

FIG. 2 depicts the described side panes 3, 4, the dashboard 9, the first display 11, the third display 12 and the eye E of a motorist. The image displayed by the display 11 is projected on the side pane 3 such that the eye E of a motorist can perceive an imaginary image 11'. The image displayed by the third display 12 is projected against the side pane 4 such that the motorist can perceive an imaginary image 12' behind the side pane 4. The illustrated first and third displays 11, 12 constitute real images and can, for example, have backlit LCDs, organic light-emitting diodes or an electron beam tube. However, it is also possible to use projectors that generate virtual images via one or more mirrors and project the images against the side panes 3, 4.

Figure 3:
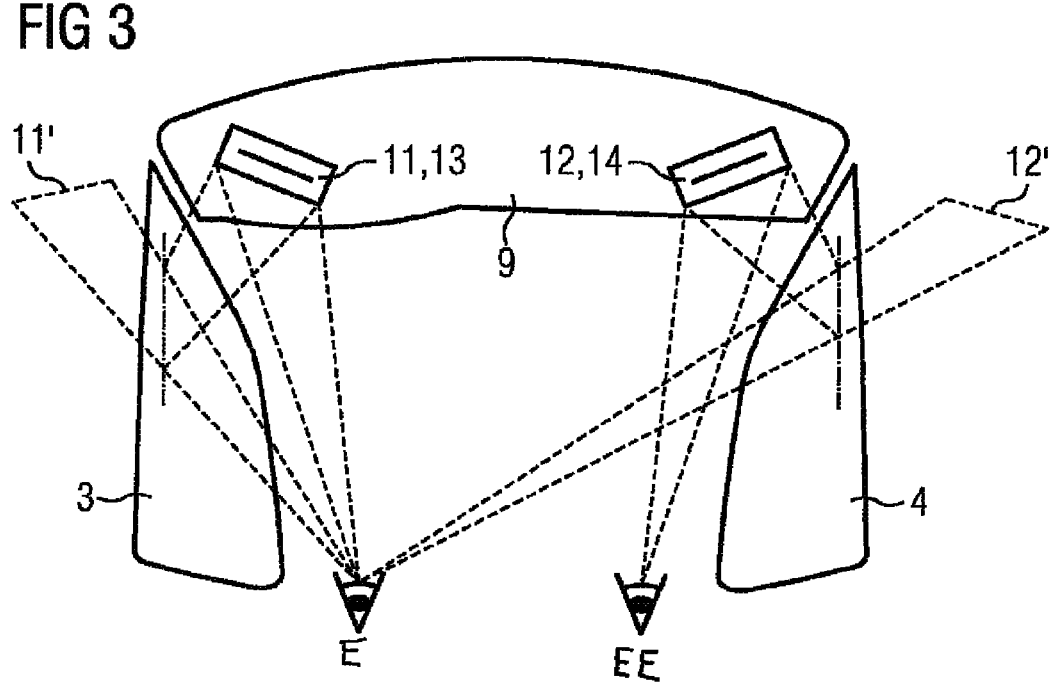
FIG. 3 is the beam path of an exemplary embodiment with two dual view displays.

In addition to the elements known from FIG. 2, there is further to be seen in FIG. 3 a second display 13 of a first dual view display, and a fourth display 14 of a second dual view display. A dual view display is fashioned in such a way that it displays a first display or a second display on the display depending on the viewing angle. In the present embodiment, the first dual view display 11, 13 is designed such that the first display 11 projects its image content against the side pane 3 such that the motorist can perceive a virtual image 11'. The second display 13 of the first dual view display is directed in such a way that the motorist can perceive the image content of the second display 13 directly as a real image. The second dual view display with the displays 12, 14 is designed in such a way that, with his eyes EE, the front seat passenger can perceive the image content of the fourth display 14 as a real image. With his eye E, the motorist can perceive the image content of the third display 12 as a virtual image 12' in the right-hand side pane.

Figure 4:
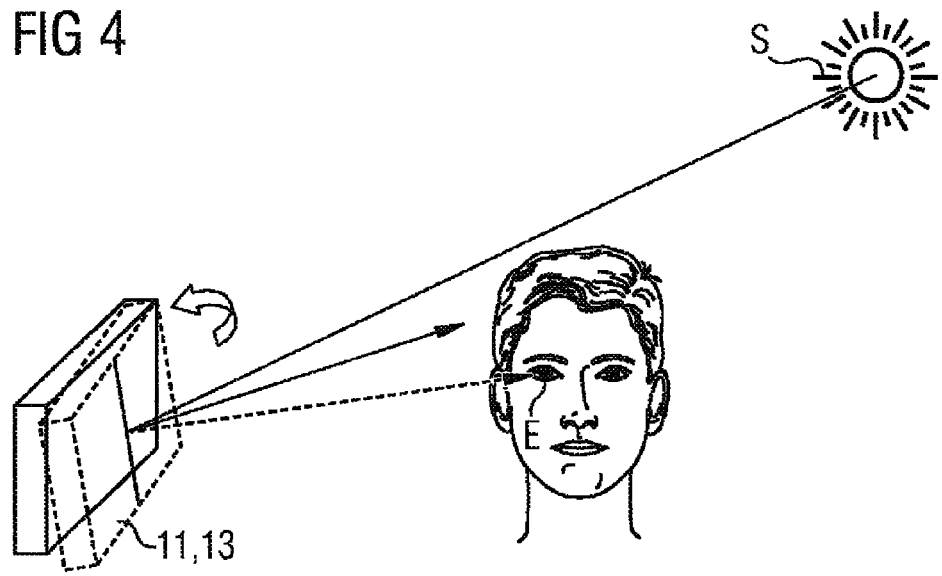
FIG. 4 is a disturbing emitter interacting with a dual view display on a motorist.

In FIG. 4 the first dual view display 11, 13, a disturbing emitter S is reflected into the eye E of a motorist. The dual view display 11, 13 can be rotated such that, for example with a low sun as illustrated by the disturbing emitter S, the first dual view display does not dazzle the motorist directly or by reflections in the side pane, and at the same time the display of the first camera is displayed on the second display 13 of the dual view display as a real image.

Figure 5:
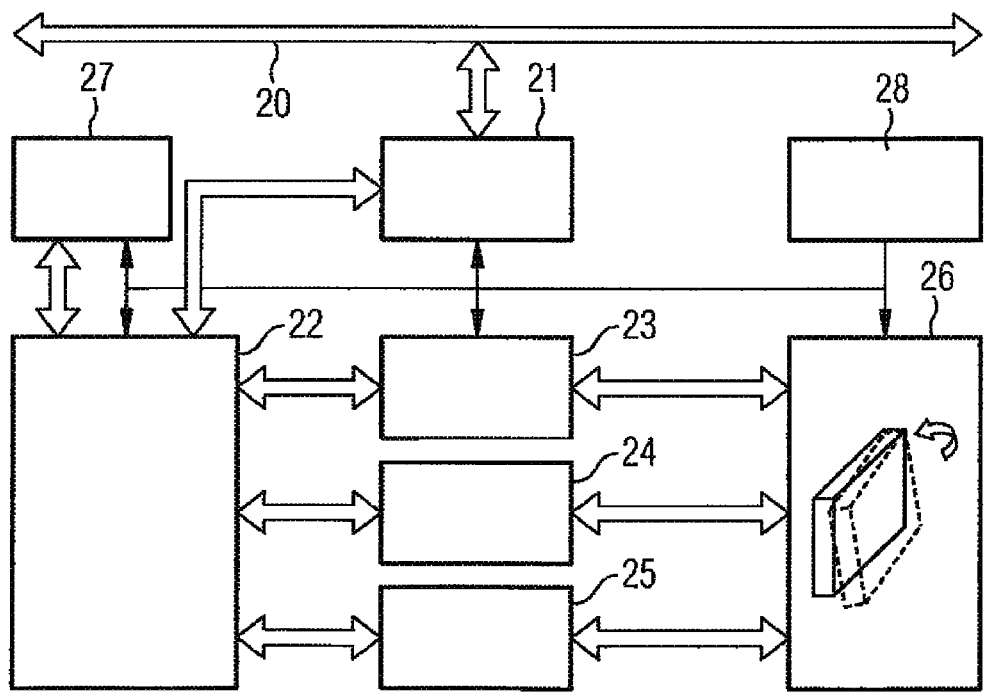
FIG. 5 is an exemplary embodiment of a processing and control unit for the motor vehicle.

FIG. 5 is an exemplary embodiment of a processing and control unit for the first to fourth displays and the external mirrors. Shown are a network 20, a transmitter 21, a processing module 22, a driver for a light sensor 23, a driver for actuating motors 24, a driver for the positioning of side pane/side mirror 25, actuating motors 26 of the dual view display, a memory 27, and a power supply 28. The transmission of all requisite data records such as, for example, scattered light brightness, scattered light incidence angle, steering movement, type of display and navigation data or position data for the display tracking is performed via the network 20, which can be embodied as CAN, K line, or MOS, for example. The transmitter 21 receives the data and makes it available to the programmable processing module 22. The processing module 22 prepares the information with the aid of the memory 27. The memory 27 contains all of the parameters and data required for operating the display tracking such as the position of the side panes, isocontrast data, type of reflection, emission angle of the dual view segment for the driver required for the tracking:

a) an actuating motor 24 driver enables the positional control of the dual view display;
b) a display driver controls the background or front illumination and the displacement of the image in such a way that the second display can be perceived, and
c) a light sensor driver 23 transmits the data for light intensity and light incidence angle.

Drivers a) and b) preferably operate bidirectionally in part, for example it is possible to check the set parameters or even the use of controls, particularly for the actuating motors. The voltages required for operating the display tracking are transmitted from the on-board voltage network via the power supply unit 28, and conditioned. It is also possible to use a teach-in module that can be used to load special display parameters which influence the control and tracking behavior of the display. The following parameters come into consideration as teach-in parameters:

isocontrast data;
    type of display;
    type of reflector;
    type of side pane;
    position of the side pane;
    emission angle of the dual view views; and
    antireflection parameters (for example the antireflection over the wavelength).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A motor vehicle comprising:
   a first camera configured to record an image of surroundings of the motor vehicle lying behind the motor vehicle;
   a side pane of the motor vehicle;
   at least one first display designed as part of a first dual view display, the first display of the dual view display is configured to be perceived as a virtual image and a second display of the dual view display is configured to be perceived as a real image arranged inside the motor vehicle configured to at least partially display the image of the surroundings recorded by the first camera;
   wherein the at least one first display is configured such that a driver of the motor vehicle can perceive at least a part of the recorded image of the surroundings as the virtual image arranged behind the side pane; and
   a light sensor configured to detect an incidence angle of a light source,
   wherein a position of the first dual view display is changed based on the incidence angle such that the driver is not distracted by the first dual view display and the image of surroundings of the motor vehicle is displayed on the second display.

2. The motor vehicle as claimed in claim 1, wherein the at least part of the image of the surroundings is projected against the side pane such that at least part of the image of the surroundings is perceived as a virtual image outside the motor vehicle.

3. The motor vehicle as claimed in claim 1, wherein the at least one of the first display and the projector is arranged in a dashboard of the motor vehicle.

4. The motor vehicle as claimed in claim 1, wherein additional warning indications are displayed with the first image.

5. The motor vehicle as claimed in claim 1, wherein a real image is produced with the display.

6. The motor vehicle as claimed in claim 1, further comprising a second dual view display comprising a third and a fourth display, wherein the driver perceives the third display as a virtual image and a front seat passenger perceives the fourth display as a real image.

7. The motor vehicle as claimed in claim 1, wherein the image of the surroundings is displayed as a real image on a second or fourth display when a corresponding side pane is let down.

8. The motor vehicle as claimed in claim 1, wherein an additional reflector is present in the region of the side pane when the side pane let down.

9. The motor vehicle as claimed in claim 1, further comprising at least one external minor configured to be retracted under the user's control upon the occurrence of a specific situation,
   wherein at least one of the first and the third display is deactivated with the at least one minor extended.

10. The motor vehicle as claimed in claim 1, wherein at least one of the first and third display is configured to be moved translationally.

11. The motor vehicle as claimed in claim 1, wherein at least one of the first and third display is configured to be moved rotationally.

12. The motor vehicle as claimed in claim 11, wherein the image of the surroundings can be displayed as a real image with the second display.

* * * * *